Nov. 16, 1965  R. R. CORDELL ETAL  3,217,546
AUTOMATIC GRAIN SAMPLING DEVICE
Filed Nov. 5, 1963  2 Sheets-Sheet 1
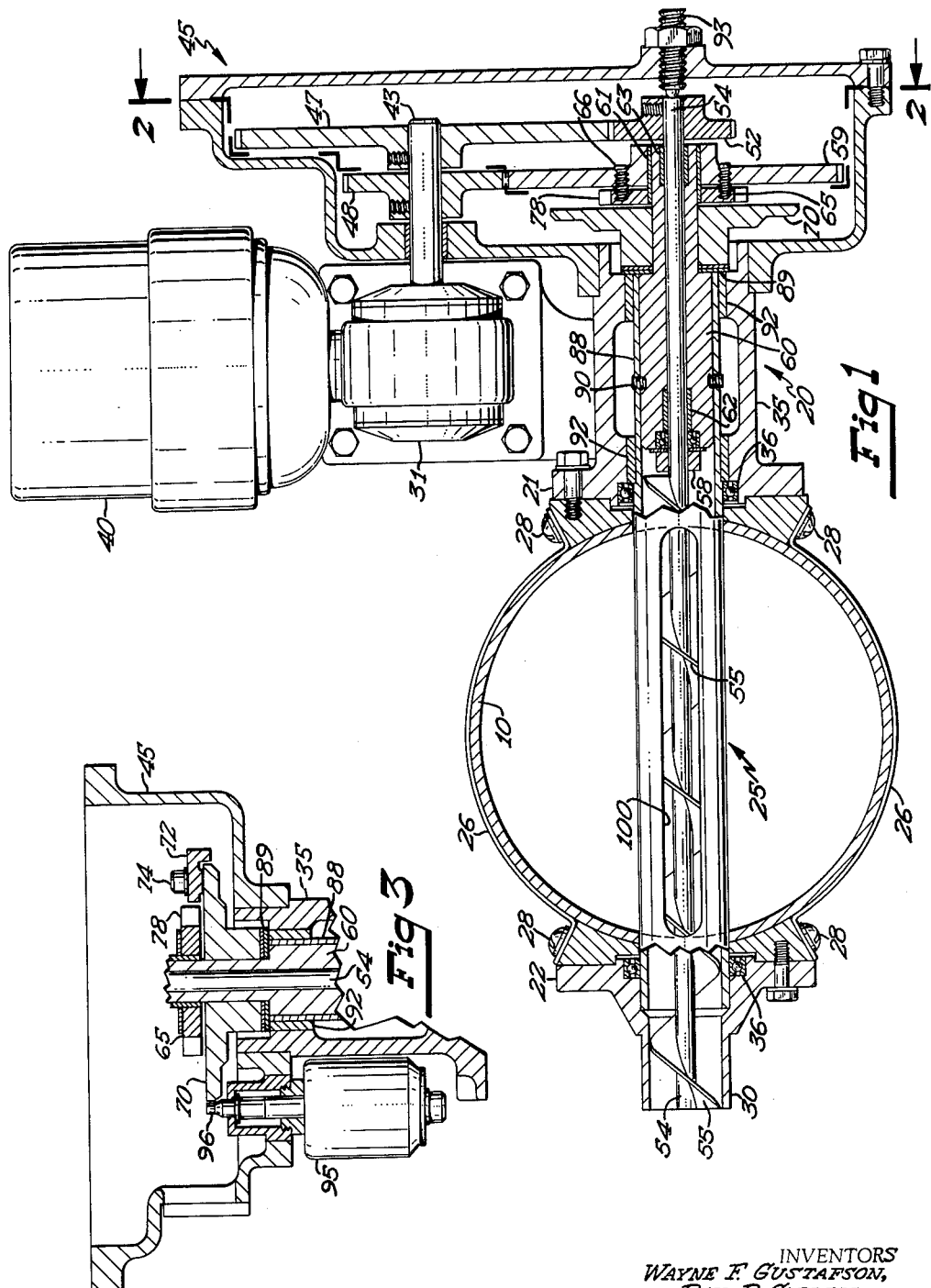
INVENTORS
WAYNE F. GUSTAFSON,
RAY R. CORDELL
BY
Schroeder & Siegfried
ATTORNEYS Nov. 16, 1965    R. R. CORDELL ETAL    3,217,546
AUTOMATIC GRAIN SAMPLING DEVICE
Filed Nov. 5, 1963    2 Sheets-Sheet 2

INVENTORS
WAYNE F. GUSTAFSON,
RAY R. CORDELL
BY
Schroeder & Siegfried
ATTORNEYS

United States Patent Office 3,217,546
Patented Nov. 16, 1965

3,217,546
AUTOMATIC GRAIN SAMPLING DEVICE
Ray R. Cordell and Wayne F. Gustafson, Minneapolis, Minn., assignors to Gustafson Manufacturing Company, Minneapolis, Minn.
Filed Nov. 5, 1963, Ser. No. 321,468
10 Claims. (Cl. 73—422)

This invention relates to automatic sampling apparatus and more particularly to an improved automatic sampling apparatus for sampling granular and powdery material in bulk. This apparatus includes provisions for selectively obtaining a plurality of samples from the flow of such material in a conveying tube as during a transfer or dispensing operation and with additional provisions for taking a continuous sample or a momentary sample during such operation.

At the present time, sampling devices of the type for sampling large quantities or units of granular and powdery materials are known and in use. Such devices, however, require complex sampling structures and special installations if they are to provide an accurate sampling of the material being conveyed or transferred. These devices may be mounted in the conveying line or in a discharge chute. In order that an accurate sampling be obtained under these conditions, the sampling device must not significantly impede the flow of material in the conveying conduit. Further, the sampling device must be capable of taking a sample across the entire cross-section of the conduit. In addition, the sampling device must be capable of discharging a sample previously taken in the continuous operation before a new sample is to be obtained, and the apparatus must be capable of controlled operation in order to provide accurate sampling.

The present automatic sampling device is directed to apparatus of this type which may be readily installed in the existing conveying lines or discharge chutes without any special coupling or housing structure and when so mounted, will not substantially impede the flow of material within the conveying tube or chute while providing an accurate sampling of the flow of material across the entire tube or chute. Further, this improved sampling device does not require any special valving and is therefore, simple in design, and installation and is easy to maintain. This improved sampling device utilizes a tube with a sample opening therein which is rotated in the flow of material within the conveying tube to pick up a sample from the entire cross-section of the tube. It incorporates an auger within the sampling tube to move the samples so obtained out of the sampling tube and into the sample discharge chute for collection or testing purposes. Further, the improved automatic sampling device is operated from a single motor means which drives both the tube and the auger in a sequence which insures operation of the auger after the sample has been picked up to clean the sample tube before a new sample is taken, and thereby insure accuracy in the sampling process. Further, this apparatus may be operated on a continuous basis in adjustable cycles, or it may be adjusted for a continuous sample over a manually determined period, or it may be utilized in obtaining a single sample for spot checking purposes.

Therefore it is an object of this invention to provide an improved automatic sampling device.

Another object of this invention is to provide an improved automatic sampling device in which a sample tube with a fixed slot therein rotates through a complete revolution in a conveying tube to provide representative sample with a rotating auger within the sampling tube to remove the sample therefrom.

Another object of this invention is to provide an improved automatic sampling device with a single motor for driving the sample tube and sampling auger within the sampling tube to insure cleanout of the sample therefrom by a difference in speeds of rotation and by rotation of the auger after the sample has been obtained by the sampling tube.

Still another object of this invention is to provide in a device of this type an improved coupling or clutching arrangement between the sampling tube and the auger from a single motor drive to provide for a fixed rotation of the sampling tube and an adjustable rotation of the sampling auger therein to insure cleanout of the tube.

A further object of this invention is to provide an improved sampling device which is readily mounted on existing conveying or discharge chutes without special coupling and without impeding the flow of material therein.

A still further object of this invention is to provide an improved automatic sampling device which permits cyclic, continuous, and momentary sampling through a simplified sampling structure and control circuit.

It is also an object of this invention to provide an improved automatic sampling device with an arrangement of parts which is simple in design, economical in construction and easy to maintain.

These and other objects of this invention will become apparent from a reading of the attached description and together with the drawings wherein:

FIGURE 1 is an elevation view of the improved automatic sampling device mounted on a conveying tube with parts of the device in section;

FIGURE 3 is a sectional view of a portion of the improved automatic sampling device taken along the lines 3—3 of FIGURE 2.

Figure 4:
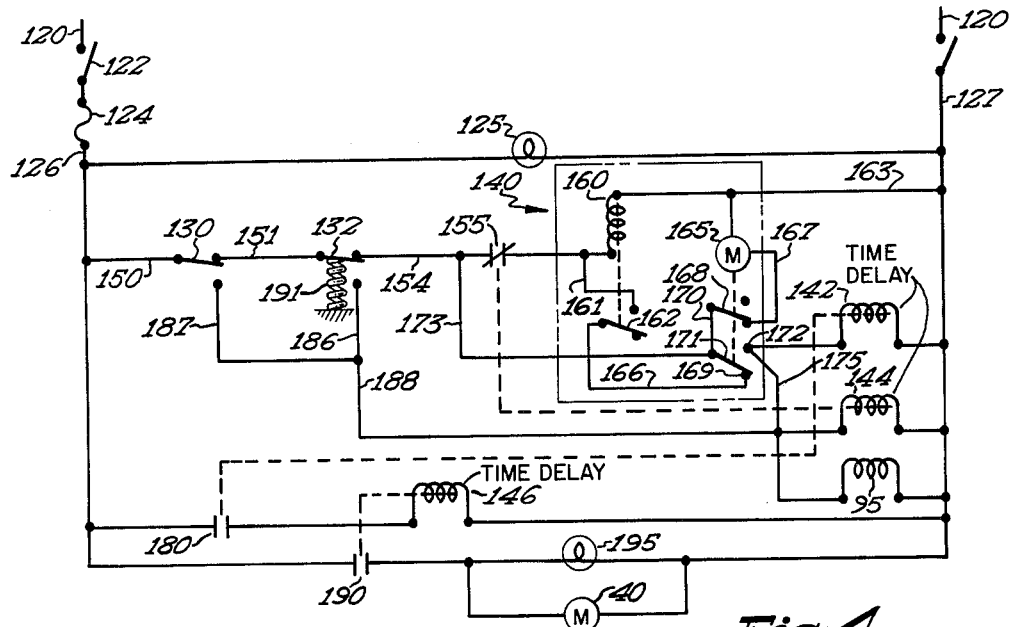
FIGURE 4 is a schematic electrical circuit of the improved sampling device.

The improved sampling device is shown in FIGURE 1 in connection with a conveying tube or discharge chute 10 which is shown in section. The sampling device includes basically a mounting structure, indicated generally at 20, comprised of parts 21 and 22 positioned on opposite sides of the conveying tube 10. The parts 21 and 22 of the mounting structure for the sampling device secure the sampling device to a conveying tube and position a sampling tube 25 of the sampling device in the conveying tube, with the sampling tube extending through apertures in the conveying tube to either side of the same. The parts 21, 22 are held together in assembled relationship by bands 26 which are secured to the parts 21, 22 through suitable screw means 28 attached at the extremities of the band such that the bands encircle the conveying tube 10.

As shown in FIGURE 1, the sampling tube 25, when so mounted on the conveying tube or discharge chute, extends across the conveying tube at the center thereof with portions of the sampling tube assembly extending beyond the periphery of the conveying tube, for purposes to be later noted. The part 22 of the mounting structure includes a circular flange portion 30 defining the discharge spout of the sampling device. The part 21 includes a flange mounting section 35 on which the remaining portion of the sampling device is mounted. Each of the parts 21, 22 include bearing means 36, which, as will be later noted, serve to journal a portion of the sampling tube in a manner to be hereinafter described. Mounted on the flange mounting section 35 of the mounting part 21 is a motor 40 having a gear reducing section 31 connected thereto and driving an output shaft 43. The output shaft 43 extends into a gear section or casing 45 and mounts therein a pair of drive gears 47, 48 which are suitably secured to the shaft. Gear casing 45 is connected to the flange mounting section 35 of the mounting part 21 through suitable means (not shown). Drive gear 47 on output shaft 43 cooperates with a pinion gear 52 mounted on a shaft portion 54 and secured thereon. Shaft portion 54 is an extension of a shaft of an auger 55 which is positioned in the sampling tube 25 with the flighting portion of the auger being located within sampling tube 25 by a collar 58 mounted on and secured to shaft portion 54, as will be later noted.

Figure 2:
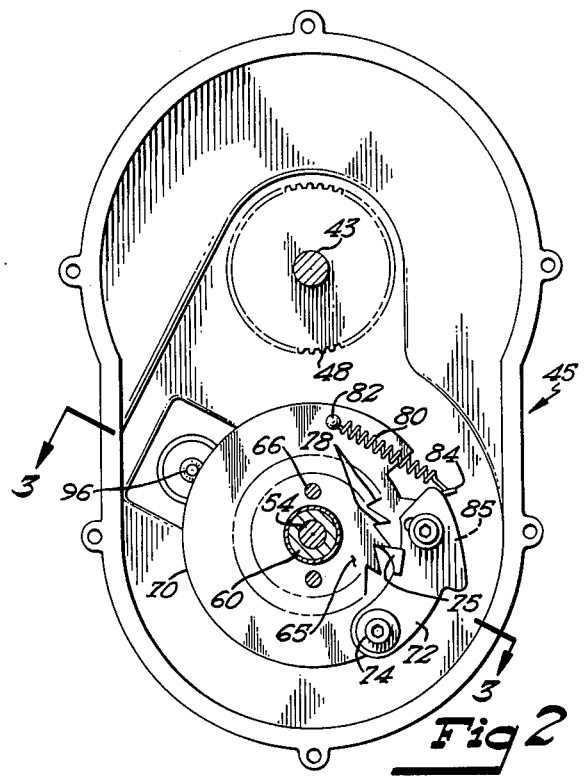
FIGURE 2 is a sectional view of the improved sampling device taken along the lines 2—2 of FIGURE 1.

Gear casing 45 also includes a drive gear 59 mounted on a sleeve member 60 through a sleeve bearing 61, which sleeve 60 also includes bearings 62, 63 for mounting and journalling the sleeve 60 on the shaft portion 54 of the auger 55. Associated with the drive gear 59 is a ratchet member 65, also mounted on bearing 61, which is best seen in FIGURES 1, 2, and 3. Ratchet member 65 is suitably connected to the drive gear 59 through bolts 66 to be driven thereby on the sleeve member 60 for rotation relative thereto. As will be noted in FIGURE 1 by the physical size of gearing 47, 48 and 52, 59, the ratio for gearing 47, 52 from the output shaft 43 to the auger shaft portion 54 is appreciably larger than the ratio of the gearing driving the ratchet member 65. The purpose of this difference in gear ratios or speeds of rotation of the ratchet member 65 with respect to the auger 55 will become evident as the disclosure proceeds.

Associated with the ratchet member 65 is a clutch plate 70 which, as will be seen in FIGURE 2, mounts a pivoted pawl member 72 which is pivoted on the clutch plate 70 through suitable pivot means 74. Pawl member 72 carries a pawl or detent 75 adapted to engage teeth 78 on the ratchet member 65 to provide a driving connection between the ratchet member 65 and the clutch plate 70. As will be best seen in FIGURE 2, the pawl member 72 is biased toward the ratchet member 65 through a suitable spring 80 attached at one extremity, as at 82, to the clutch plate 70 and at the other extremity, to a finger 84 of the pawl member 72. Pawl member 72 is so mounted on the clutch plate 70 such that the detent or pawl 75 overlies the teeth 78 on the ratchet member 65 and such that the pawl member 72 may be pivoted toward and away from the ratchet member 65 to provide a clutching arrangement therebetween. Clutch plate 70 is mounted on the sleeve member 60 through a press fit which in turn is connected to a portion 88 of the sampling tube located within the mounting flange section 35 of the mounting structure 20. Clutch plate 70 is also spaced from the flange section 35 by washer means 89 which reduces the friction of engagement of the clutch plate 70 with this portion of the mounting structure. The sleeve member 60 is connected to the portion 88 of the sampling tube 25 through suitable means such as a screw, indicated at 90. Further, this portion of the tube is journalled within the flange section 35 of the mounting structure 20 through suitable bearing means indicated at 92. Thus it will be seen that the sampling tube 25 will be rotated by the clutch plate 70 and ratchet member 65 on the bearings 36 and 92 within the mounting structure 20 relative to the conveying tube 10. Further, the auger 55 is journalled within the sampling tube 25 through bearings 62, 63 for rotation within the sampling tube. Collar 58 on shaft portion 54 of the auger bears against sleeve member 60 to position the auger within sampling tube 25 and a screw 93 in casing 45 bears against the end of the shaft portion 54 to locate the shaft and pinion gear 52 in the gear casing 45.

The clutch formed by the clutch plate 70 with the pawl member 72 thereon and the ratchet member 65 is operated by a solenoid 95 which is mounted on the gear casing 45 attached to the mounting structure 20 (see FIGURE 3). Solenoid 95 has a thrust pin 96 which extends into the gear casing 45 adjacent the clutch plate 70. The thrust pin 96 is adapted to engage or cooperate with the finger 84 on the pawl member 72 to normally hold the detent or pawl 75 out of engagement with the teeth 78 of the ratchet member 65, preventing connection between the clutch parts and eliminating or breaking the driving connection from the motor 40 through the gearing 48, 59 to the sampling tube 25. As will be seen in FIGURE 2, the thrust pin 96 which is located adjacent the path of rotation of the clutch plate 70 will be engaged by the finger 84 of the pawl member 72 to urge the detent 75 out of engagement with the ratchet member 65 and provide rest position for the sampling tube.

In this location or position, the sampling tube will be so positioned in the conveying tube 10 that an elongated slot 100 in the sampling tube 25 which extends substantially across the interior of the conveying tube 10, will be facing downstream of the flow of material through the conveying tube 10. The sampling tube 25 with the slot 100 therein is designed to be rotated through 360° of angular rotation within the conveying tube 10 during a sampling operation and such rotation will be controlled through the clutch in accordance with the operation of the solenoid 95, as will be hereinafter described. The driving connection for the sampling tube 25 from motor 40 will be initiated by energization of the solenoid 95 which will withdraw the thrust pin 96 into the confines of the solenoid, breaking the engagement between the pin and the finger 84 on the pawl member 72 allowing the pawl member, under the influence of the spring 80, to be urged into engagement with the ratchet teeth 78. The direction of rotation of the ratchet member, as seen in FIGURE 2, will be in a clockwise direction, causing the clutch plate 70 with the pawl member 72 thereon to be driven on sleeve member 60 to provide a driving connection or rotation to the sampling tube 25 through the connection of the sleeve member 60 with the tube at the screw 90. This rotation will continue through 360°. The energization of solenoid 95 will be such that the solenoid will be momentarily energized to deflect the thrust pin 96 allowing engagement of the clutch parts after which time the solenoid will be de-energized and the pin will return through conventional spring action (not shown) to its de-energized position where it will be in position to again engage the finger 84 on the pawl member 72 as it is rotated back into proximity with the thrust pin 96. At this point, which occurs after 360° of rotation, the engagement of the thrust pin 96 with the finger 84 of pawl member 72 causes clutch parts to be separated by urging of the pawl member 72 out of engagement with the teeth 78 on the ratchet member 65 against the influence of the spring 80. With such disengagement of the clutch parts, the sampling tube will stop even though the motor 40 continues to rotate the ratchet member 65 and the auger 55. In normal operation, this fixed rotation of the sampling tube provides for a single rotation of the slot 100 in the sampling tube to pick up a sample from the conveying tube 10 after which the sampling tube 25 remains in its normal position facing downstream of the flow and no further sample will be taken into the sampling tube. The motor 40, as will be hereinafter noted, will continue to be energized for a given period to drive the auger 55 such that the sample within the sampling tube will be removed therefrom through the discharge spout 30. As previously indicated, the relative speeds of rotation of the sampling tube 25, during its single revolution of sampling movement, and the auger 55 is in a ratio of 1 to 7 insuring positive clean-out and transfer of the sample from the tube 25 through the discharge opening at all times.

The motor 40 and clutch solenoid 95 are energized through an electrical circuit shown in FIGURE 4. This circuit includes a pair of source conductors 120 representing a 115 volt, 60 cycle alternating current source which has connected thereto an on-off switch 122 and fuse 124 to control the power to the electric control circuit. This control circuit beyond the switch 122 is evidenced by conductors 126, 127. A pilot light 125 is connected across these conductors to provide an indication of the application of power to the control circuit upon closure of the switch 122. The control circuit includes a pair of single throw double pole switches 130, 132 which are shown positioned in their off position and are utilized for manual operation of the sampling device.

Automatic operation of the sampling device is provided through energization and operation of an interval timer, indicated generally at 140, which timer controls the energization of a first timing relay 142 and a timing reset relay 144. The energization circuit for the interval timer 140 includes a conductor 150 connected to conductor 126 and switch 130 in the off position and extending through a conductor 151 and the off position of switch 132. This circuit is completed through a conductor 154 from switch 132 and a normally closed contact 155 of the timing reset relay 144 to a relay coil 160 of timer 140, which in turn is connected to a conductor 163 and the opposite side of the source of power evidenced by conductor 127. Timer 140 also includes a timing motor 165 which is connected to the conductor 163 and a conductor 167 leading to a first switch 168 operated by timing motor 165. Switch 168 is of a normally closed type and is operated by the timing motor 165, as will be hereinafter noted, to control the energization circuit for the timing motor 165. The energizing circuit for the timing motor 165 extends from switch 168 through a conductor 170 and a conductor 173 connected to the conductor 154 leading through the switches 130, 132 to the opposite side of the power source or conductor 126. The timer 140 also includes a holding switch 162 operated by the relay coil 160, which switch provides a by-pass circuit around the contact 155. This bypass circuit includes a conductor 161 attached to the relay coil 160 and a conductor 166 leading to a normally closed contact 169 of a second switch 171 driven by timing motor 165 and through the conductor 173 to the conductor 154 bypassing the normally closed contact 155. Switch 171 includes a normally open contact 172 which is connected to the timing relay 142 and through a conductor 175 to the reset relay 144 and the clutch solenoid 95. The opposite extremities of each of these relays and the solenoid are connected to the supply conductor 127.

The reset relay 144 is a timing relay having time delay on closing and time delay on opening that is effective to reset the timing motor 165 and relay coil 160 of the interval timer 140. The timing relay 142 has associated therewith a normally open contact 180 which connects the supply conductor 126 to a motor relay coil 146, whose opposite side is connected to the supply conductor 127. Motor relay 146 is of the time delay type and includes a normally open contact 190 which connects the supply conductor 126 to the motor 40 with the opposite side of the motor being connected to the supply conductor 127. Connected in parallel with motor 40 is an indicating light 195 which indicates energization of the motor 40 and operation of the sampling device.

In operation, the improved sampling device has a continuous or automatic timed cycle or mode of operation as well as two manual modes of operation. In the normal or automatic mode of operation, the timer 140 controls the energization and operation of the motor 40 and clutch solenoid 95 for operation or rotation of the sampling tube 25 and the auger 55 therein. This circuit is completed from the supply conductor 126 through the off position of the switches 130, 132, the conductors 150, 151 and 154 to the timer 140. The relay coil 160 of the timer is energized through the normally closed contact 155 of the timing reset relay 144 and the timing motor 165 is energized through a circuit which includes conductors 173, 170, switch 168 in the off or closed position, and conductor 167 connecting timing motor 165 and conductor 163 to the supply conductor 127. Thus the timing motor 165 and relay coil 160 will be energized with the relay coil 160 operating immediately to set up the holding circuit through its switch 162. The switches 168 and 171 of timing motor 165 are of the type which do not close immediately but are operated from their normally closed to their normally open positions after a predetermined time cycle of operation of timing motor 165. This interval timer is of the type which can be set manually for adjustable time cycles, the timing operation being determined by the operation of the motor through a suitable connection (not shown) in the operation of the switches 168 and 171. At the end of the timing sequence of the timing motor 165, switches 168, 171 will operate and with such operation, the energizing circuit for the motor 165 will be broken at the switch 168. Similarly, the operation of switch 171 will provide an energizing circuit though the switch at its normally open contact 172 to the timing relay coil 142, the timing reset coil 144 and the clutch solenoid 95. The timing relay 142 has its normally open contact 180 closed at this time energizing the motor relay coil 146. Both the relays 142 and 146 are of the time delay type with a time delay provision being either fixed or adjustable and providing delay on opening after de-energization of the coil. Thus the motor relay coil 146 will be immediately energized and through its contact 190 will energize the motor 40 simultaneously with the energization of the clutch solenoid 95. With the end of the timing cycle of the timing motor 165 and operation of the clutch solenoid 95 and motor 40, the reset relay 144 will also be energized. This relay has time delay provision on closing and opening with a very short time delay upon closing which provides for opening of the normally closed contact 155 insuring de-energization of the relay coil 160. The de-energization of the timing motor 165 will effect a reset of the timer 140 in which the switches are restored to the normal position, as shown in the drawing, to start another timing sequence. During this period of time, the relay contact 180 of timing relay 142 will be closed as will the relay contact 190 of the motor relay coil 146. The motor 40 will be energized and the solenoid 95 will have been momentarily energized and returned to the de-energized position with the recycling of the motor switch 171 of the timer 140. This operation of the clutch solenoid 95 will allow engagement of the pawl member 72 with the ratchet member 65 to provide the driving connection from the gear train including gears 48 and 59 from the shaft 43 to cause rotation of the sampling tube 25. This rotation will continue through the 360° rotation of the sampling tube until the orginal or starting position is reached. Clutch solenoid 95 in its de-energized position at this point through its thrust pin 96 will disengage the pawl member 72 from ratchet member 65 breaking the drive or clutching connection between the gear train and the sampling tube 25 to stop the sampling tube in its normal downstream position. During this period of time, the motor 40 will remain energized due to the time delay aspect of the relays 142 and 146. The relay 142 will be de-energized with the recycling of the timer 140, but it will have sufficient time delay on dropout to maintain relay coil 146 energized for a predetermined period. With the de-energization of the relay coil 146, its contacts will have a further time delay on dropout such that the contact 190 will remain closed and the motor energized. This normal timing sequence will extend beyond the rotation of the sampling tube through its sampling cycle or 360° of rotation. The auger 55 will also be rotated at a relatively higher speed of rotation than that of the sampling tube 25 causing cleanout of the sample therefrom. This higher speed of rotation of auger 55 will continue beyond the de-clutching of the sampling tube from the motor insuring positive cleanout of the sample from the sampling tube 25 through the discharge spout 30 until the time delay relay coil 146 opens its contact 190 de-energizing the motor 40. Light 195, which is connected in a parallel circuit with the motor 40, will indicate the operation of the motor 40 during this period.

The manually initiated modes of operation of the sampling device as controlled by the switches 130 and 132 are provided through conductors 187 and 186 connected to the off positions of each of the switches and through a conductor 188 to the conductor 175 leading to the clutch solenoid 95 and the timing relay 142. In the first of these modes of operation, the switch 130 will be moved from its normally closed or off position to its normally open position providing a circuit from the supply conductor 126 through the conductor 150 and switch 130 to the conductor 187, to the conductor 188 and the clutch solenoid 95 which is connected to the supply conductor 127. In parallel with this circuit is the conductor 175 and timing relay 142 which is also connected to the supply conductor 127. In addition, the timing reset relay 144 is included in this circuit, but since its contact 155 is effective only in controlling the energization of the timer 140, which under these conditions is isolated by operation of the switch 130 to its on position, the operation of the contact 155 will have no effect. With the operation of the clutch solenoid 95, the sampling tube 25 will be connected to the driving motor 40 through the clutch formed by clutch plate 70 and ratchet member 65. Simultaneously therewith, the energization of the relay 142 will operate through its contact 180 to energize the relay coil 146 which in turn controls the energization of the motor 40. As long as the continuous switch is held in its on position, the timer 140 will be isolated from this energizing circuit and the sampling tube 25 will continue to be rotated by the motor 40, which will also drive the auger 55 continuously. This is a continuous sampling condition in which the sampling tube is rotated and the sample is picked up by the sampling tube 25 during each revolution through its slot 100, which sample will be discharged through the discharge spout 30 in the sampling tube through operation of the auger 55. The continuous energization of the clutch solenoid 95 will maintain the pin 96 thereof out of engagement with the pawl member 72 so that the driving connection to the sampling tube will be maintained. This mode of operation will continue until the continuous switch is moved to the off position, at which time the clutch solenoid 95 will be de-energized allowing the sampling tube 25 to rotate back to its original rest position and the motor 40 to continue operation of the auger through the time delay provision of relays 142 and 146 until after the sampling tube 25 has reached its rest position and the sample in the sampling tube has been removed therefrom.

The third mode of operation is that of a manual instantaneous type, and the switch 132 is shown with a spring 191 associated therewith to indicate that it will be moved from the normally closed to normally open position momentarily and return to the off position when the switch is released. The initiation of this circuit by deflection of the switch 132 will energize the clutch solenoid 95 and motor 40 to cause rotation of the sampling tube 25 and the auger 55 therein. Upon release of the switch 132, the timing sequence from the coils 142 and 146 will allow the sampling motor to rotate after the clutch solenoid has been de-energized and the thrust pin 96 thereon engages the finger 84 of the pawl member 72 to disengage the clutch parts 70 and 65. The energization circuit for the relays 142 and 146, as well as the clutch solenoid 95 and the motor 40, is the same as that for continuous operation and the only difference between the modes of operation is the operation of the manual momentary switch 132.

In this improved automatic sampling device, the electric motor 40 operates the sampling tube 25 through a given cycle of rotation similar to a valving operation for the collection of a sample from the conveying tube 10. This sampling cycle is controlled and related to the cleanout cycle or operation of the auger such that positive cleanout of the sampling tube is insured. The improved apparatus requires no special modification of the conveying tube 10 and the sampling tube 25 and the type of valve operation included therein provides no impedance to flow of the conveyed material through the conveying tube 10. Further, the mechanical arrangement of driving the sampling tube 25 from the motor 40 insures that the sampling tube will always remain in the fixed rest position and rotate through a given angular rotation in the sampling operation. This provides for uniformity and accuracy in sampling.

In considering this invention, it should be remembered that the present disclosure is intended to be illustrative only and the scope of the invention should be determined only by the appended claims.

We claim:
1. An automatic sampling device comprising,
  (a) a sampling tube,
  (b) means mounting the sampling tube and adapted to be positioned in a conveying tube such that the sampling tube extends therethrough,
  (c) a slot in said sampling tube positioned in the conveying tube when the sampling tube is positioned in the conveying tube, said sampling tube having a discharge opening therein remote from said slot,
  (d) an auger positioned in said sampling tube and journalled therein,
  (e) means journalling said sampling tube in said mounting means for rotation about an axis coincident with the axis of rotation of the auger,
  (f) a motor mounted on said mounting means and connected to said auger to rotate said auger within said sampling tube,
  (g) clutch means connected to said motor and said sampling tube to cause said sampling tube to be rotated through said motor,
  (h) electro-magnetic means for coupling said sampling tube to said motor through said clutch means,
  (i) and control means connected to said motor and said electro-magnetic means for controllably energizing the same.

2. The automatic sampling device of claim 1 in which the discharge opening in the sampling tube is located in the end of the sampling tube remote from said motor and said clutch means.

3. The automatic sampling device of claim 1 in which the connection of said motor and said clutch means includes a gear reduction having different stages of gearing therein such that the ratio of speed of rotation between said auger and said sampling tube is greater than 1.

4. The automatic sampling device of claim 3 in which the speed ratio between the auger and the sampling tube is approximately 7.

5. The automatic sampling device of claim 1 in which the slot in the sampling tube extends substantially across the interior dimension of the conveying tube when the sampling tube is positioned in a conveying tube.

6. The sampling device of claim 4 in which the clutch means is comprised of a ratchet member connected to the gear reduction and a pawl member connected to the sampling tube, and in which the electro-magnetic means includes a pin normally holding the pawl member out of engagement with the ratchet member to prevent a driving connection between said members with the pin being momentarily moved by momentary energization of the electro-magnetic means to allow engagement between said members after which the pin will move to its original position and disengage the pawl member from the ratchet member after the sampling tube and pawl member have rotated through one complete revolution.

7. The automatic sampling device of claim 6 in which the slot in the sampling tube is located downstream of the direction of flow through the conveying tube when the pawl member is disengaged from the ratchet member.

8. The automatic sampling device of claim 7 in which the control circuit means includes an interval timer controlling cyclically the energization of said motor and said electro-magnetic means with additional time delay means included in the energizing circuit for said motor to maintain the motor energized for a period of time after the electro-magnetic means is de-energized.

9. The automatic sampling device of claim 8 and including switching means connected in said control circuit means to selectively provide for energization of said motor and said electro-magnetic means independent of the interval timer.

10. The sampling device of claim 8 in which the sampling tube includes a discharge spout at the extremity of the tube remote from said motor and the slot and the sampling tube extends across the interior of said conveying tube.

References Cited by the Examiner
UNITED STATES PATENTS

| | | | |
|---|---|---|---|
| 1,448,758 | 3/1923 | Martin | 73—424 |
| 3,060,746 | 10/1962 | Gompper | 73—422 |

RICHARD C. QUEISSER, *Primary Examiner.*

Disclaimer 3,217,546.—*Ray R. Cordell* and *Wayne F. Gustafson*, Minneapolis, Minn. AUTOMATIC GRAIN SAMPLING DEVICE. Patent dated Nov. 16, 1965. Disclaimer filed Mar. 14, 1977, by the assignee, *Gustafson, Inc.*

Hereby enters this disclaimer to claims 1–10 of said patent.

[*Official Gazette October 3, 1978.*]